United States Patent Office 3,582,302
Patented June 1, 1971

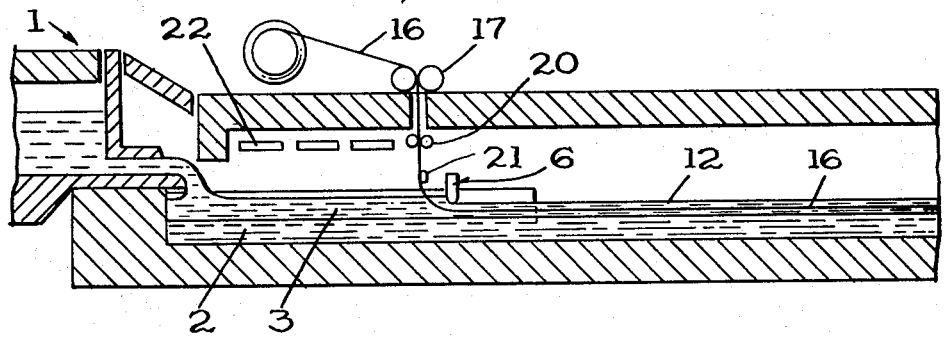
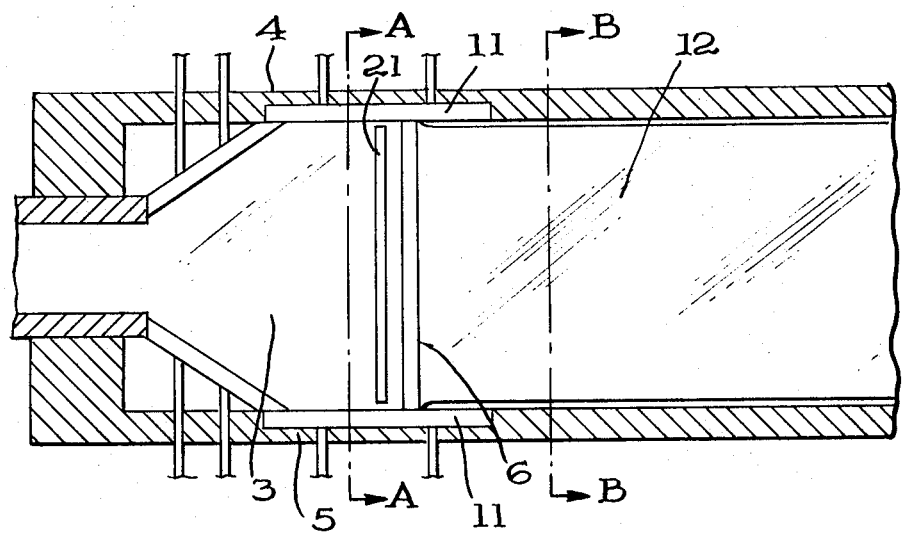
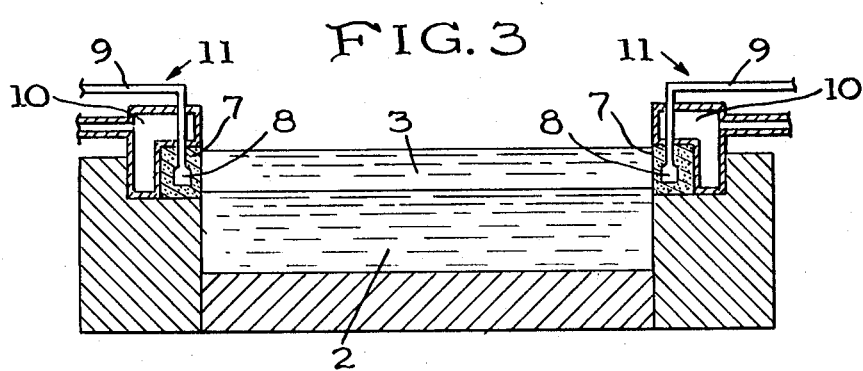

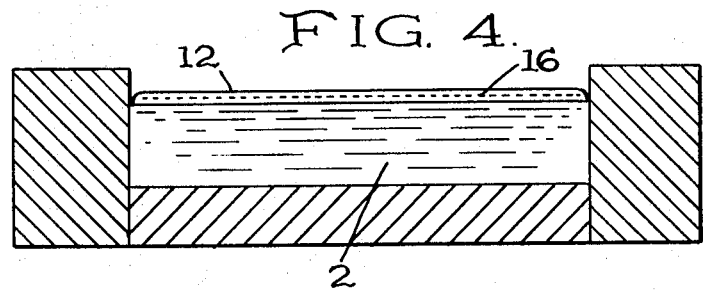
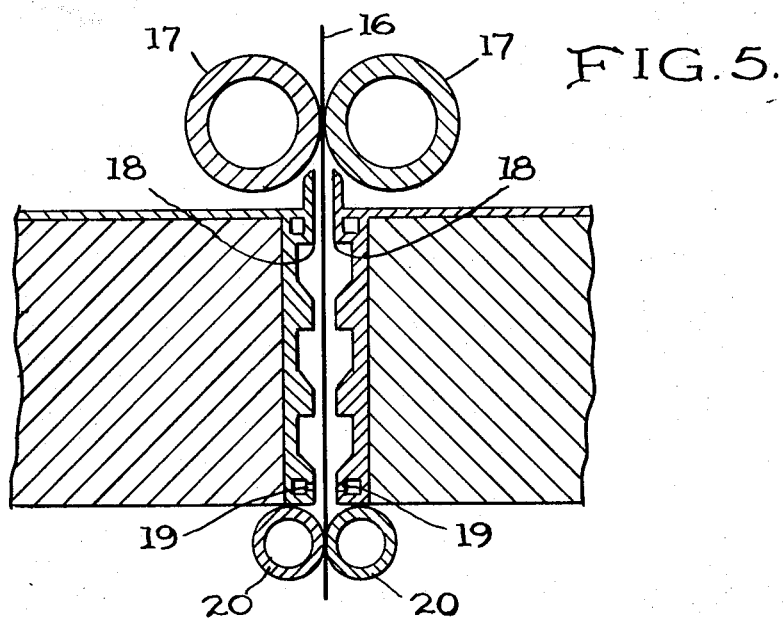
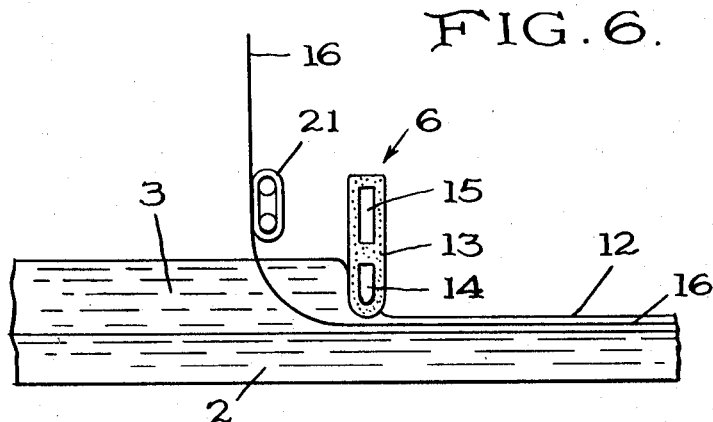

3,582,302
PROCESS AND APPARATUS FOR CONTINUOUS MANUFACTURE OF REINFORCED GLASS RIBBON
Hideo Kita and Yoshiaki Miwa, Maizuru-shi, Kyoto-fu, Japan, assignors to Nippon Sheet Glass Co., Ltd., Osaka, Japan
Filed Sept. 4, 1968, Ser. No. 757,392
Claims priority, application Japan, Sept. 11, 1967, 42/58,291
Int. Cl. C03b *13/10, 18/00*
U.S. Cl. 65—51                                                  7 Claims

ABSTRACT OF THE DISCLOSURE

Reinforced glass ribbon manufactured by feeding molten glass onto a bath of molten metal under a non-oxidizing atmosphere, forming a pool of the molten glass by restricting its free flow on the bath by means of a dam disposed across the bath with a slight clearance between its bottom and the upper surface of the bath, introducing a reinforcing material into the pool from above, drawing out the molten glass and the reinforcing material simultaneously through said clearance to form a composite ribbon and advancing the composite ribbon over the bath surface.

---

This invention relates to a process for continuous manufacture of glass ribbon, particularly glass ribbon reinforced with a wire net, and to an apparatus suitable for use in the process.

A conventional process for continuously manufacturing a reinforced glass ribbon comprises introducing such a reinforcing material as a metal net into the center of a glass layer when a molten glass is made into a glass ribbon by passing it between two sizing rolls. The composite glass ribbon is polished by means of a continuous polisher after solidification by cooling whereby the surface of the glass is finished to provide a smooth, lustrous surface.

The present invention provides a process for the continuous manufacture of a reinforced glass ribbon, which comprises feeding molten glass onto a bath of molten metal under a non-oxidizing atmosphere, forming a pool of the molten glass by restricting its free flow on the bath by means of a dam disposed across the bath with a slight clearance between its bottom and the upper surface of the bath, introducing a reinforcing material into the pool of the molten glass from above, drawing out the molten glass and the reinforcing material simultaneously through said clearance to form a composite ribbon and advancing the composite ribbon over the bath.

The invention also provides an apparatus for use in the continuous manufacture of reinforced glass ribbon, which comprises a tank structure for holding a bath of molten metal and maintaining a non-oxidizing atmosphere over the bath, a dam for forming a pool of molten glass on the bath by restricting a free flow of a molten glass continuously supplied onto the bath, said dam being disposed across the bath with a slight clearance between its bottom and the upper surface of the bath, means for continuously supplying a reinforcing material through a ceiling of the tank structure into said pool of molten glass, means for drawing out the molten glass and the reinforcing material simultaneously through said clearance to form a composite ribbon and advancing the composite ribbon over the bath, and means for guiding the reinforcing material which is being supplied towards the pool of molten glass and for adjusting a tension of the reinforcing material.

It is preferable that the said dam should be constructed with a gas-permeable porous material at least at that portion which faces the molten glass on the bath, and contain inside the said porous portion a cavity extending along its length, and that it should also include a conduit communicating with said cavity for introducing a pressurized non-oxidizing gas into the cavity so as to cause the gas to be blown out from said porous part against the glass on the bath.

The dam plays a role of sizing means, and the glass is sized between the bottom of the dam and the upper surface of the molten metal bath. The clearance between the bottom of the dam and the upper surface of the bath should therefore be determined optionally according to the desired thickness of a final product. When the process is practiced while a pressurized non-oxidizing gas is jetted out from the surface of the dam towards the glass drawn out from the clearance between the upper surface of the bath and the bottom of the dam, the glass is sized between the upper surface of the bath and a thin gas film formed on the surface of the dam.

Usually, molten glass flowing on a molten metal bath reaches an equilibrium thickness after spreading freely on the bath. When a metal net or wire mesh is inserted into a spreading glass, it is distorted with the spreading of the glass. On the other hand, it is very difficult to insert a metal net from above a glass ribbon which has spread substantial amount, because the glass is very thin. According to the invention, one can very simply accomplish the insertion of a metal net or wire mesh, as it is inserted into a glass layer which has attained a certain depth. In the invention, the metal net hardly changes in a widthwise direction both when it is inserted into glass, and when the so reinforced glass is made into a glass ribbon of a predetermined thickness. Furthermore, the metal net is not burned by oxidation because it is handled in a non-oxidizing atmosphere. When a metal net is inserted into a glass material, too, there is less bubbling from it. Another advantage is that there is only a small thermal difference between the metal net and the glass material because the metal net has been sufficiently exposed to a high temperature atmosphere before insertion, and that no such distortion of the metal net as is usually caused by a difference in thermal expansion occurs at the time of immersion into the glass. The net-reinforced glass ribbon which is sized to a predetermined thickness after passing through the dam advances over the bath while holding the metal net inside, and is further finished on the bath to provide a smooth, lustrous surface, followed by cooling.

Accordingly, the process and apparatus of the invention have made it possible to manufacture a transparent and smooth net-incorporated glass continuously with good efficiency without necessitating a polishing step after solidification by cooling.

With reference to the accompanying drawings:
FIG. 1 is a longitudinal cross vertical section illustrating an embodiment of the invention;
FIG. 2 is a plan view of FIG. 1;
FIG. 3 is a transverse cross-section taken on the line A—A of FIG. 2;
FIG. 4 is a similar transverse section taken on the line B—B of FIG. 2;
FIG. 5 is an enlarged cross-sectional detail showing the state where the atmosphere is shut off at the inlet and entry of a reinforcing material; and
FIG. 6 is a side elevation partially in vertical cross-section showing the principal part of the apparatus for forming a net-incorporated glass.

Molten glass 3 fed at a controlled rate from a glass tank furnace 1 onto a molten metal bath 2 advances on the bath while spreading, and dammed by a dam 6 whereby it is made into a glass layer of a certain depth. The molten glass 3 is confined within a space surrounded by side walls 4 and 5 of the bath and a dam 6 provided across the bath. The atmosphere above the bath is non-oxidizing (a gaseous mixture of $N_2$ and $H_2$). It is preferable that side walls of the bath at least in the vicinity of a portion where a metal net is inserted should be of a gas-lubricating structure to prevent the adhesion between them and the glass. To this end, a portion which comes in contact with molten glass is constructed with a porous refractory material, and a pressurized gas is fed thereinto and jetted out from the surface of the side walls, whereby the adhesion of the glass is prevented by a gas film. As shown in FIG. 3, a gas-lubricating member composed of a porous refractory material such as graphite and high alumina refractory material 7, a pressure chamber 8 provided in its interior, a conduit 9 leading to the pressure chamber, and a cooling box 10 consitutes side walls. The dam 6 provided across the bath of molten metal is situated above the bath with a slight clearance from the upper surface of the bath. The clearance is varied by moving and adjusting the height position of dam 6. It is preferred that the dam 6, like the said side walls, should be constructed with a gas-lubricating member. A gas is introduced into the inside 14 of a high alumina refractory material 13, and is jetted out from the surface to form a gas film on the surface of the dam, thus preventing the adhesion of glass. A cooling medium is circulated in a member 15.

A metal net 16 is supplied by a pair of rolls 17 from the ceiling of a non-oxidizing atmosphere furnace. At the inlet of the tank for supplying the metal net, an atmosphere outside is shut off by a gas curtain as shown in FIG. 5. The intrusion of an outer atmosphere is prevented by jetting out a non-oxidizing gas from members 18 and 19. A pair of rolls 20 is provided within the tank to receive the metal net delivered into the furnace by a pair of rolls 20 so that the rate of feeding the metal net into the glass and the tension exerted on the metal net may be controlled. The metal net is introduced into the molten glass pool 3 while the angle of immersion of the metal net and its tension are being adjusted by an adjusting guide 21 disposed between the rolls 20 and the glass. The tension of the metal net can also be adjusted by changing a rate at which a composite ribbon is drawn out by a device (not shown) for drawing out the metal net together with glass from between the dam and the bath as a composite ribbon 12, and advancing it over the bath. A heater 22 is provided in the ceiling of the tank structure for heating the molten glass pool 3.

A glass ribbon with metal net 16 is drawn out from a clearance between the dam 6 and the upper surface of the metal bath 2. A slight unevenness on both surface of the glass ribbon which has occurred at the time of inserting the metal net and passing through the dam will be removed while the glass which is still at a high temperature advances over the bath. The net-incorporated glass ribbon advances on the bath, and is then solidified by cooling.

In the above-mentioned embodiment of the invention, the side walls of a molten metal bath are of a gas-lubricating structure. It is also possible to provide this gas-lubricating structure inside the side walls to control the width of molten glass staying on the bath.

We claim:

1. Process for the continuous manufacture of reinforced glass ribbon, which comprises feeding molten glass onto a bath of molten metal under a non-oxidizing atmosphere, forming a pool of the molten glass by restricting its free flow on the bath by means of a dam disposed across the bath with a slight clearance between its bottom and the upper surface of the bath, blowing non-oxidizing gas against at least the side edges of the molten glass through gas-permeable porous materials while forming the pool; introducing a wire mesh reinforcing material into the pool of the molten glass from above, drawing out the molten glass and said reinforcing material while applying a predetermined degree of tension to and for correctly positioning said reinforcing material, and continuing said drawing out simultaneously through said dam clearance and between said gas permeable porous side materials to form a composite ribbon, and advancing the composite ribbon over the bath.

2. Process as defined in claim 1, wherein at least that part of said dam which faces the molten glass on the bath is made of a gas-permeable porous material and the process is carried out while also blowing out a pressurized non-oxidizing gas from porous dam part against the glass on the bath.

3. The process as defined in claim 1, further including preheating the reinforcing material to a temperature near that of the molten glass to preclude undue distortion with only a minimal amount of unevenness to the molten glass during the supplying and introduction of the reinforcing material into the molten glass.

4. The process as defined in claim 1, further including the step of smoothing the composite glass ribbon while it is still at high temperature while advancing upon the molten metal bath.

5. Apparatus for use in the continuous manufacture of reinforced glass ribbon, which comprises a tank structure for holding a bath of molten metal and for maintaining a non-oxidizing atmosphere over the bath; a dam for forming a pool of molten glass on the bath by restricting a free flow of a molten glass continuously supplied onto the bath; said dam being disposed across the bath with a slight clearance between its bottom and the upper surface of the bath; gas permeable porous materials disposed at least at opposite sides of the tank in the area of which said glass pool and ribbon is being formed to permit blowing of non-oxidizing gas against at least the sides of the ribbon being formed; means for continuously supplying a reinforcing material through a ceiling of the tank structure for insertion into said pool of molten glass; means for applying a predetermined degree of tension to said reinforcing means during the insertion of the reinforcing means and its subsequent composite drawing action to assure its correct predetermined position within the molten glass; means for drawing out the molten glass and the reinforcing material simultaneously through said clearance to form a composite ribbon and advancing the composite ribbon over the bath, and means for guiding the reinforcing material which is being supplied towards the pool of molten glass and for adjusting a tension of the reinforcing material.

6. Apparatus as defined in claim 5, wherein at least that part of said dam which faces the molten glass on the bath is made of a gas-permeable porous material, said dam having in the inside of its porous part a cavity extending along its length and having a conduit communicating with said cavity for introducing a pressurized non-oxidizing gas into the cavity so that said gas is blown out through said porous part against the glass on the bath.

7. Apparatus as defined in claim 5, including means for preheating and maintaining the temperaure of the reinforcing means at a high thermal temperature near that of the molten glass prior to and during insertion in said glass.

References Cited

UNITED STATES PATENTS

| | | | |
|---|---|---|---|
| 1,901,743 | 3/1933 | Forester | 65—148 |
| 3,413,107 | 11/1968 | Lajarte | 65—182X |
| 3,442,636 | 5/1969 | Kita et al. | 65—99AX |

S. LEON BASHORE, Primary Examiner

R. L. LINDSAY, JR., Assistant Examiner

U.S. Cl. X.R.

65—65, 99, 146, 182